(12) United States Patent
Lin et al.

(10) Patent No.: US 8,806,340 B2
(45) Date of Patent: Aug. 12, 2014

(54) METHOD AND APPARATUS FOR EMBEDDING MEDIA PROGRAMS HAVING CUSTOM USER SELECTABLE THUMBNAILS

(75) Inventors: Andrew Cheng-min Lin, Branchburg, NJ (US); Eric Buehl, Studio City, CA (US); Tienan Ren, Beijing (CN); Xin Jin, Beijing (CN); Eric I. Feng, Marina Del Rey, CA (US)

(73) Assignee: Hulu, LLC, Santa Monica, CA (US)

( * ) Notice: Subject to any disclaimer, the term of this patent is extended or adjusted under 35 U.S.C. 154(b) by 282 days.

(21) Appl. No.: 12/874,081

(22) Filed: Sep. 1, 2010

(65) Prior Publication Data

US 2012/0054615 A1 Mar. 1, 2012

(51) Int. Cl.
G06F 3/00 (2006.01)
G11B 27/34 (2006.01)
H04N 5/445 (2011.01)

(52) U.S. Cl.
CPC ............ *G11B 27/34* (2013.01); *H04N 5/44543* (2013.01)
USPC .......................................... 715/719; 715/721

(58) Field of Classification Search
None
See application file for complete search history.

(56) References Cited

U.S. PATENT DOCUMENTS

| | | | |
|---|---|---|---|
| 6,677,961 B1* | 1/2004 | Bhat | 715/723 |
| 6,895,407 B2* | 5/2005 | Romer et al. | 348/722 |
| 2002/0069218 A1* | 6/2002 | Sull et al. | 707/501.1 |
| 2004/0004626 A1* | 1/2004 | Ida et al. | 345/626 |
| 2005/0047681 A1* | 3/2005 | Hori et al. | 382/305 |
| 2005/0149557 A1* | 7/2005 | Moriya et al. | 707/104.1 |
| 2006/0117356 A1 | 6/2006 | Jojic et al. | |
| 2007/0044010 A1* | 2/2007 | Sull et al. | 715/500.1 |
| 2008/0059989 A1* | 3/2008 | O'Connor et al. | 725/9 |
| 2008/0262914 A1* | 10/2008 | Suveyke et al. | 705/14 |
| 2009/0100462 A1 | 4/2009 | Park et al. | |
| 2009/0249229 A1* | 10/2009 | Offer | 715/760 |
| 2009/0265737 A1* | 10/2009 | Issa et al. | 725/38 |
| 2009/0322790 A1* | 12/2009 | Behar et al. | 345/659 |
| 2010/0011297 A1* | 1/2010 | Tsai et al. | 715/721 |
| 2010/0017366 A1* | 1/2010 | Robertson et al. | 707/3 |
| 2010/0088726 A1* | 4/2010 | Curtis et al. | 725/45 |
| 2010/0100899 A1 | 4/2010 | Bradbury | |
| 2010/0107126 A1* | 4/2010 | Lin et al. | 715/838 |
| 2010/0115410 A1* | 5/2010 | Fu et al. | 715/721 |
| 2010/0131613 A1* | 5/2010 | Jonsson et al. | 709/218 |

OTHER PUBLICATIONS

International Organization for Standardisation, "Overview of the MPEG-4 Standard", Mar. 2002.*
International Search Report and Written Opinion dated Jan. 17, 2012.

* cited by examiner

*Primary Examiner* — Ryan Pitaro
*Assistant Examiner* — Maryam Ipakchi
(74) *Attorney, Agent, or Firm* — Fountainhead Law Group P.C.

(57) ABSTRACT

A method and apparatus for embedding a media program with a randomly user selected thumbnail is disclosed. The user can scan a media program to identify one of a plurality of media program frames, select the frame of interest, then designate it as the thumbnail to use in connection with the embedded media program.

58 Claims, 10 Drawing Sheets

| N images | image 1 start location;<br>image 2 start location;<br>image 3 start location;<br>⋮<br>image N start location. | image 1 | image 1 | ⋯ | image N |

13865861-thumbnail.file

FIG. 8

METHOD AND APPARATUS FOR EMBEDDING MEDIA PROGRAMS HAVING CUSTOM USER SELECTABLE THUMBNAILS

BACKGROUND OF THE INVENTION

1. Field of the Invention

The present invention relates to systems and methods for presenting media programs, and in particular to a system and method and apparatus for embedding media programs.

2. Description of the Related Art

The dissemination and playback of media programs has undergone substantial changes in the past decade. Previously, media programs (which may include audio, video, or both) were disseminated either by analog broadcast (conventional, satellite, or cable) or by physical dissemination of films to movie theaters.

These traditional dissemination and playback means remain in use after the advent of digital technology. However, digital technologies have had a profound effect on the dissemination and playback of media programs.

First, digital technology permitted the use of digital video recorders (DVRs). DVRs, while similar in function to standard analog video cassette recorders (VCRs), provide a number of additional useful functions including live pause, the ability to record one program while playing back another, and the integration of the electronic program guides with DVR functionality (so that the recordation of media programs could be scheduled far in advance and more easily).

Second, largely due to improved signal processing and more and widespread high-speed Internet access availability (e.g. DSL, fiber, and/or satellite), digital technology also permitted the dissemination and playback of media programs via the Internet. Dissemination of media programs via the Internet may occur either by simple downloading, progressive downloading or streaming.

With progressive downloading, a media file having the media program is downloaded via the Internet using dial-up, DSL, ADSL, cable, T1, or other high-speed connection, typically by a web server via the Internet.

Unlike simple downloading, in which bytes of the media file may be downloaded in any convenient order, progressive downloading downloads bytes from the beginning of a file and continues downloading the file sequentially and consecutively until the last byte. In some progressive downloading implementations, the entire file must be downloaded first before a media player can start playback. However, progressive downloading may permit media players to start playback once enough of the beginning of the file has been downloaded. Playback of progressively downloaded media files is often delayed by slow Internet connections and is also often choppy and/or contains a high likelihood of stopping after only a few seconds. Once a progressively downloaded media program has been completely downloaded, it may be stored on the end-user computer for later use.

One of the disadvantages of progressive downloading is that the entity transmitting the data (the web server) simply pushes the data to the client as fast as possible. It may appear to be "streaming" the video because the progressive download capability of many media players allows playback as soon as an adequate amount of data has been downloaded. However, the user cannot fast-forward to the end of the file until the entire file has been delivered by the web server. Another disadvantage with progressive downloading is that the web server does not make allowances for the data rate of the video file. Hence if the network bandwidth is lower than the data rate required by the video file, the user would have to wait a period of time before playback can begin. If playback speed exceeds the data transfer speed, playback may be paused for a period of time while additional data is downloaded, interrupting the viewing experience. However, the video playback quality may be higher when the playback occurs because of the potentially higher data rate. For example, if a 100 kbps video file can be delivered over a 56 kbps modem, the video will be presented at the 100 kbps rate, but there may be periods when playback will be paused while additional video data is downloaded. The video data is typically downloaded and stored as a temporary file in its entirety.

Web servers typically use HTTP (hypertext transport protocol) on top of TCP (transfer control protocol) to transfer files over the network. TCP, which controls the transport of data packets over the network, is optimized for guaranteed delivery of data, not speed. Therefore, if a browser senses that data is missing, a resend request will be issued and the data will be resent. In networks with high delivery errors, resend requests may consume a large amount of bandwidth. Since TCP is not designed for efficient delivery of adequate data or bandwidth control (but rather guaranteed delivery of all data), it is not preferred for the delivery of video data in all applications.

Streaming delivers media content continuously to a media player and media playback occurs simultaneously. The end-user is capable of playing the media immediately upon delivery by the content provider. Traditional streaming techniques originate from a single provider delivering a stream of data to a set of end-users. High bandwidths and central processing unit (CPU) power are required to deliver a single stream to a large audience, and the required bandwidth of the provider increases as the number of end-users increases.

Unlike progressive downloading, streaming media can be delivered on-demand or live. Wherein progressive download requires downloading the entire file or downloading enough of the entire file to start playback at the beginning, streaming enables immediate playback at any point within the file. End-users may skip through the media file to start playback or change playback to any point in the media file. Hence, the end-user does not need to wait for the file to progressively download. Typically, streaming media is delivered from a few dedicated servers having high bandwidth capabilities.

A streaming media server is a specialized device that accepts requests for video files, and with information about the format, bandwidth and structure of those files, delivers just the amount of data necessary to play the video, at the rate needed to play it. Streaming media servers may also account for the transmission bandwidth and capabilities of the media player. Unlike the web server, the streaming media server communicates with the user computer using control messages and data messages to adjust to changing network conditions as the video is played. These control messages can include commands for trick play functions such as fast forward, fast reverse, pausing, or seeking to a particular part of the file. Since a streaming media server transmits video data only as needed and at the rate that is needed, precise control over the number of streams served can be maintained. Unlike the case with progressive downloading, the viewer will not be able to view high data rate videos over a lower data rate transmission medium. However, (1) streaming media servers provide users random access to the video file, (2) streaming media servers allow monitoring of who is viewing what video programs and how long they are watched (3) streaming media servers use transmission bandwidth more efficiently, since only the amount of data required to support the viewing experience is transmitted, and (4) the video file transmitted by streaming media servers is not stored in the viewer's computer, but discarded by the media player, thus allowing more control over the content.

Streaming media servers may use HTTP and TCP to deliver video streams, but generally use RSTP (real time streaming protocol) and UDP (user datagram protocol). These protocols permit control messages and save bandwidth by reducing overhead. Unlike TCP, when data is dropped during transmission, UDP does not transmit resent requests. Instead, the server continues to send data. Streaming media servers can also deliver live webcasts and can multicast, which allows more than one client to tune into a single stream, thus saving bandwidth.

Typically, progressively downloaded media is transmitted to the user computer at a rate that is faster than playback. The media program player buffers this data, and may indicate how much of the media program has been buffered by providing an indicator, usually as a part of a "progress bar." A control is often provided that allows the user to go to any point in the program that has already been buffered by selecting the control and moving it to a different location along the progress bar. This allows the user to randomly access any buffered portion of the media program.

Streaming media players do not rely on buffering to provide random access to any point in the media program. Instead, this is accomplished through the use of control messages transmitted from the media player to the streaming media server.

Streaming media and progressive downloading allows the media to be played back via media players that can be embedded in the webpages of third parties. This is usually accomplished by embedding code provided by the media program provider into the source of the webpage. For example, if the webpage host wishes to embed a particular media program in a webpage, the host's webmaster copies the code obtained from the media program provider (which includes a link to media program player instructions as well as a link to the media program itself) into the source of the webpage. Embedding may also be used to present a media program in a social forum or other media.

When the embedded media program player code instructions are executed, the user's browser presents a rendering of the media program player with the playback area depicting a thumbnail of the media program obtained from one of its frames. That thumbnail is presented in the playback area to provide a visual reference for the media program, and is generally more attractive than a blank screen. When the media program is played (either automatically or by user selection of an appropriate control on the embedded media player) the thumbnail disappears, and the media program begins to play.

One of the problems with such existing systems is that the thumbnail initially presented by the embedded media program player is obtained from either the first frame of the media program or from a randomly chosen frame. The randomly chosen thumbnail is typically not representative of the media program itself.

Some systems give the user a choice of a limited number of thumbnails (three for example). Still others permit the user to upload their own custom thumbnail for use in their embedded media programs. This allows the user to choose any thumbnail they wish, but requires that the user define and upload the new thumbnail.

While these solutions permit custom thumbnails, they are not easily implemented. Media program players and related videos are often embedded in on-line forums and other situations where the user is unwilling to devote a lot of time or effort into customizing the thumbnail presented in the embedded media program player, and many of the users of such forums are not fluent or familiar with the techniques by which the task can be performed manually.

Accordingly, there is a need for a system and method that allows users to embed a media program in a webpage having a thumbnail that is quickly and easily selected by the user. The present invention satisfies that need.

SUMMARY OF THE INVENTION

To address the requirements described above, the present invention discloses a method and apparatus for identifying user selected custom thumbnails for use in an embedded media program. In one embodiment, the method comprises the steps of receiving a command to scan a subset of the plurality of frames, the subset of the plurality of frames spanning the entire media program, transmitting the subset of the plurality of frames responsive to the received scan command, receiving a command to embed the media program, the command identifying one of the subset of frames as a thumbnail for visually representing the media program, generating instructions for embedding media program, the instructions including a global address to the media program having a first index to the identified frame, and transmitting the generated instructions. The invention can also be embodied in an apparatus comprising means for performing the above steps, including a processor having a memory storing processor instructions for performing the foregoing steps.

BRIEF DESCRIPTION OF THE DRAWINGS

Referring now to the drawings in which like reference numbers represent corresponding parts throughout:

FIG. 8 is a diagram illustrating the structure of one embodiment of a thumbnail file.

DETAILED DESCRIPTION OF PREFERRED EMBODIMENTS

In the following description, reference is made to the accompanying drawings which form a part hereof, and which is shown, by way of illustration, several embodiments of the present invention. It is understood that other embodiments may be utilized and structural changes may be made without departing from the scope of the present invention.

Figure 1:
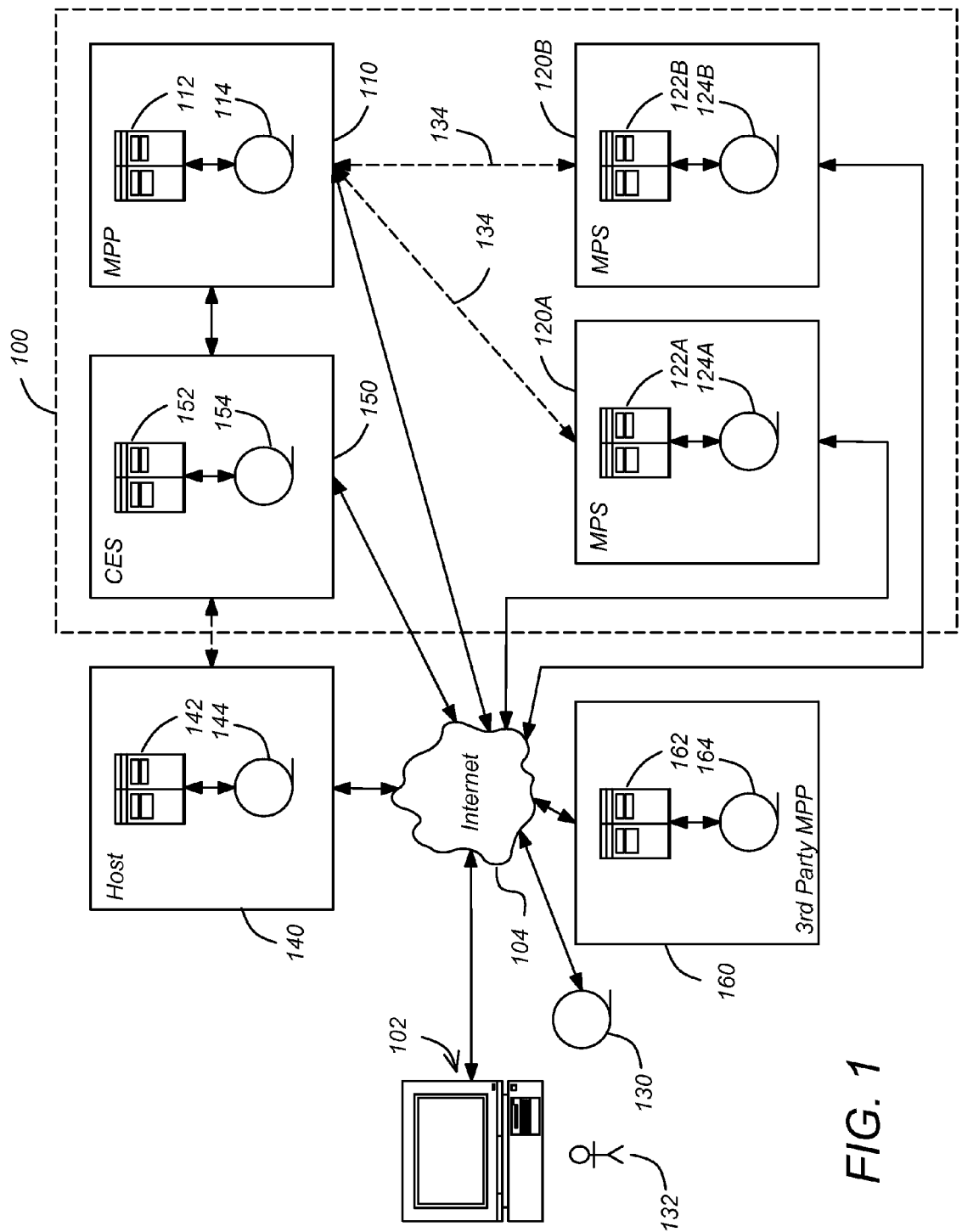
FIG. 1 is a diagram illustrating an exemplary media program system and related elements.

FIG. 1 is a diagram illustrating an exemplary media program system 100 and related elements. In the illustrated embodiment, the media program system 100 may comprise one or more media program sources (MPS) 120A, 120B, communicatively coupled to a communication network 104 such as the Internet and each having one or more source video servers 122A, 122B communicatively coupled to one or more source media program databases 124A, 124B. The media program system 100 further comprises a media program provider (MPP) 110, communicatively coupled to the communication network 104, and having one or more provider computers 112 and a provider media program database 114. The computers 112 can include one or more media servers, a web server, and any other processing elements necessary to perform the steps and functions described below. In one embodiment, the MPP 110 is a video-on-demand and/or streaming media program provider.

The media program may be provided by the MPP 110, or by a MPS 120, which may be a commercially separate entity from the MPP 110. To provide the media program directly from the MPP 110 to the user computer 102, the MPP 110 licenses or purchases media programs from the media program sources 120 (such as www.fox.com or www.nbc.com). Typically, the MPS 120 also provides metadata for such programs. This metadata is typically adequate (e.g. it need not be supplemented by information from other sources) and can be stored and retrieved by the MPP database 114 for use.

When the media programs are provided directly from the MPS(s) 120 instead of the MPP 110, it is often the case that the metadata provided by the media program source 120 is insufficient. In such cases, supplementary metadata may be obtained from an independent media program source 130 (such as www.tv.com or www.imdb.com) or other third party sources. In this circumstance, the role of the media program provider 110 is that of a portal that provides users 132a list of available media programs and an interface that allows the user to search for such programs and to view them.

Media programs and metadata may be obtained via the communication network 104 or through auxiliary (and/or dedicated) communication links 134 by webcrawling (for example, using a program or automated script that browses the World Wide Web in a methodical, automated manner).

Using the client computer 102, remote users 132 can communicate with the media program provider 110, to obtain media programs (including video-on-demand and/or streaming video services) and to search the provider media program database 114 to find media programs of interest.

Using the client computer 102, remote users 132 can also transmit and receive information from third party entities 140 communicatively coupled to the Internet. Such third party entities include, for example, search portals (e.g. www.yahoo.com or www.google.com) or servers hosting information such as commercial information, blogs, or on-line forums and the like. Hereinafter, servers hosting such information are alternately referred to as host servers. In either case, the third party entity 140 may include a server 142 and a database 144.

The media program system 100 may also include a content enhancement system 150 having a content enhancement server 152 communicatively coupled to an associated content enhancement database 154. As used herein, a "database" is an integrated collection of logically related records or files consolidated into a common pool, and may include a data collection searchable by an index.

The content enhancement system 150 transmits coded instructions to the third party entities 140 to be included in the webpages hosted by the third party entity 140 as further described below. The coded instructions may comprise a servlet, a snippet, an applet, a plurality of HTML instructions, or any other analogous code. When executed, these coded instructions provide access to a media program and a reference to media programs stored in the media program system 100 or hosted by third party media program providers 160 that are commercially separate from the media program system 100. The third party media program providers 160 may also include one or more servers 162 communicatively coupled to one or more databases 164.

The content enhancement system 150 and the media program provider 110 may be commercially indistinct entities, and in one embodiment, the content enhancement system 150 forms a part of the media program provider 110. The media program sources 120A, 120B are typically commercially distinct from the content enhancement system 150 and the media program provider 110. Third party host entity 140 is likewise typically commercially distinct from the media program provider 110 and the content enhancement system 150, but also commercially distinct from the media program sources 120A, 120B. Similarly, the third party media program provider 160 is typically commercially distinct from the media program provider 110 and the content enhancement system 150, as well as the media program providers 150A, 150B, and the third party host entity 140. However, the present invention may be practiced in embodiments where any of the foregoing elements are commercially indistinct or commercially distinct. As the term is used herein, a commercially distinct entity is one which is not partially or wholly owned by the other.

Figure 2:
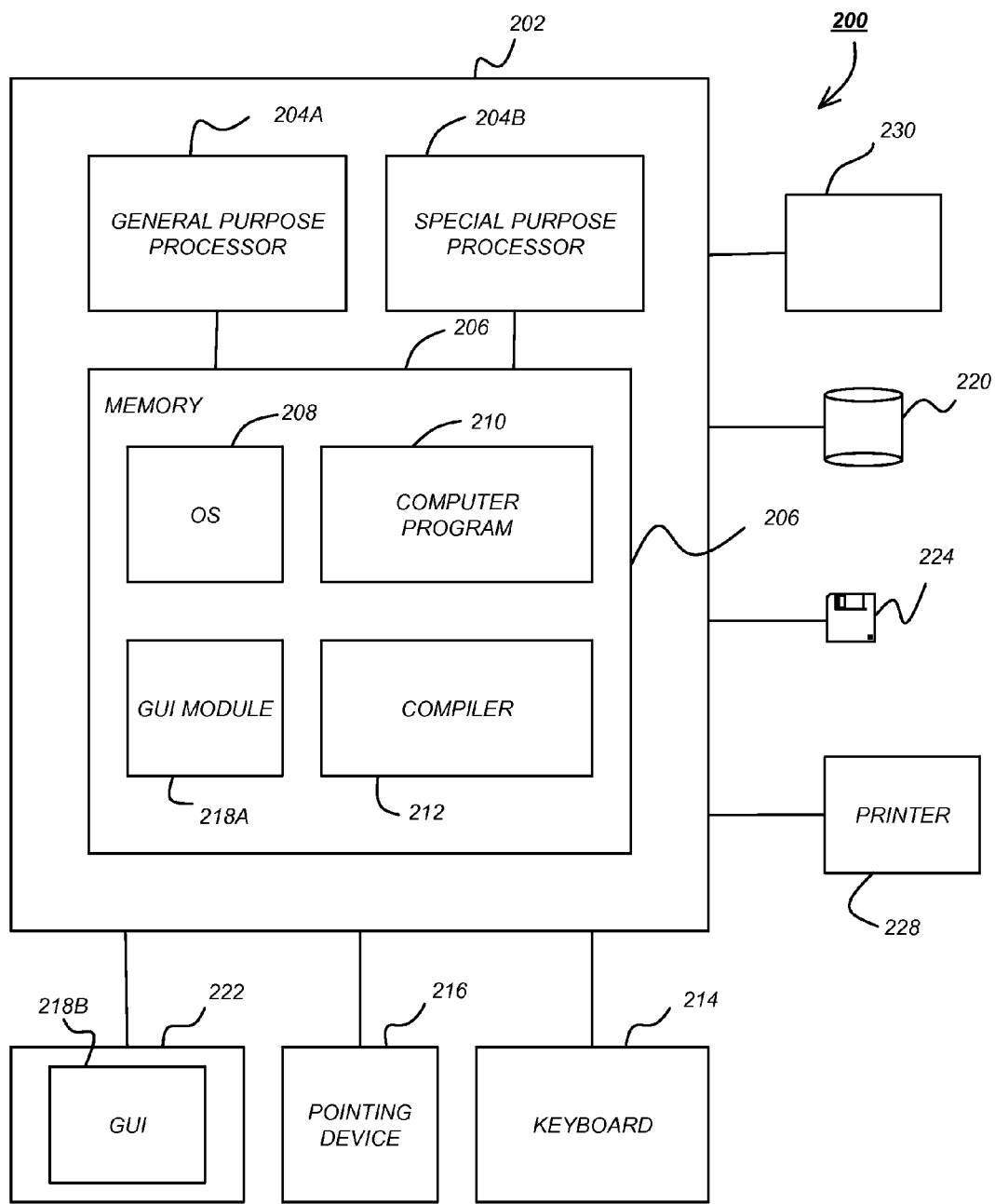
FIG. 2 is a diagram illustrating an exemplary computer system that could be used to implement elements of the present invention, including the client computers, servers and the databases.

FIG. 2 is a diagram illustrating an exemplary computer system 200 that could be used to implement elements of the present invention, including the client computer 102, servers 112, 122, 142, 152 and 162 and the databases 114, 124, 144, 142 and 164. The computer 202 comprises a general purpose hardware processor 204A and/or a special purpose hardware processor 204B (hereinafter alternatively collectively referred to as processor 204) and a memory 206, such as random access memory (RAM). The computer 202 may be coupled to other devices, including input/output (I/O) devices such as a keyboard 214, a mouse device 216 and a printer 228.

In one embodiment, the computer 202 operates by the general purpose processor 204A performing instructions defined by the computer program 210 under control of an operating system 208. The computer program 210 and/or the operating system 208 may be stored in the memory 206 and may interface with the user 332 and/or other devices to accept input and commands and, based on such input and commands and the instructions defined by the computer program 210 and operating system 208 to provide output and results.

Output/results may be presented on the display 222 or provided to another device for presentation or further processing or action. In one embodiment, the display 222 comprises a liquid crystal display (LCD) having a plurality of separately addressable pixels formed by liquid crystals. Each pixel of the display 222 changes to an opaque or translucent state to form a part of the image on the display in response to the data or information generated by the processor 204 from the application of the instructions of the computer program 210 and/or operating system 208 to the input and commands. Other display 222 types also include picture elements that change state in order to create the image presented on the display 222. The image may be provided through a graphical user interface (GUI) module 218A. Although the GUI module 218A is depicted as a separate module, the instructions performing the GUI functions can be resident or distributed in the operating system 208, the computer program 210, or implemented with special purpose memory and processors.

Some or all of the operations performed by the computer 202 according to the computer program 210 instructions may be implemented in a special purpose processor 204B. In this embodiment, some or all of the computer program 210 instructions may be implemented via firmware instructions stored in a read only memory (ROM), a programmable read only memory (PROM) or flash memory within the special purpose processor 204B or in memory 206. The special purpose processor 204B may also be hardwired through circuit design to perform some or all of the operations to implement the present invention. Further, the special purpose processor 204B may be a hybrid processor, which includes dedicated circuitry for performing a subset of functions, and other circuits for performing more general functions such as responding to computer program instructions. In one embodiment, the special purpose processor is an application specific integrated circuit (ASIC).

The computer 202 may also implement a compiler 212 which allows an application program 210 written in a programming language such as COBOL, C++, FORTRAN, or other language to be translated into processor 204 readable code. After completion, the application or computer program 210 accesses and manipulates data accepted from I/O devices and stored in the memory 206 of the computer 202 using the relationships and logic that was generated using the compiler 212.

The computer 202 also optionally comprises an external communication device such as a modem, satellite link, Ethernet card, or other device for accepting input from and providing output to other computers.

In one embodiment, instructions implementing the operating system 208, the computer program 210, and/or the compiler 212 are tangibly embodied in a computer-readable medium, e.g., data storage device 220, which could include one or more fixed or removable data storage devices, such as a zip drive, floppy disc drive 224, hard drive, CD-ROM drive, tape drive, or a flash drive. Further, the operating system 208 and the computer program 210 are comprised of computer program instructions which, when accessed, read and executed by the computer 202, causes the computer 202 to perform the steps necessary to implement and/or use the present invention or to load the program of instructions into a memory, thus creating a special purpose data structure causing the computer to operate as a specially programmed computer executing the method steps described herein. Computer program 210 and/or operating instructions may also be tangibly embodied in memory 206 and/or data communications devices 230, thereby making a computer program product or article of manufacture according to the invention. As such, the terms "article of manufacture," "program storage device" and "computer program product" or "computer readable storage device" as used herein are intended to encompass a computer program accessible from any computer readable device or media.

Of course, those skilled in the art will recognize that any combination of the above components, or any number of different components, peripherals, and other devices, may be used with the computer 202.

Although the term "computer" is referred to herein, it is understood that the computer may include portable devices such as cellphones, portable MP3 players, video game consoles, notebook computers, pocket computers, or any other device with suitable processing, communication, and input/output capability.

Figure 3A:
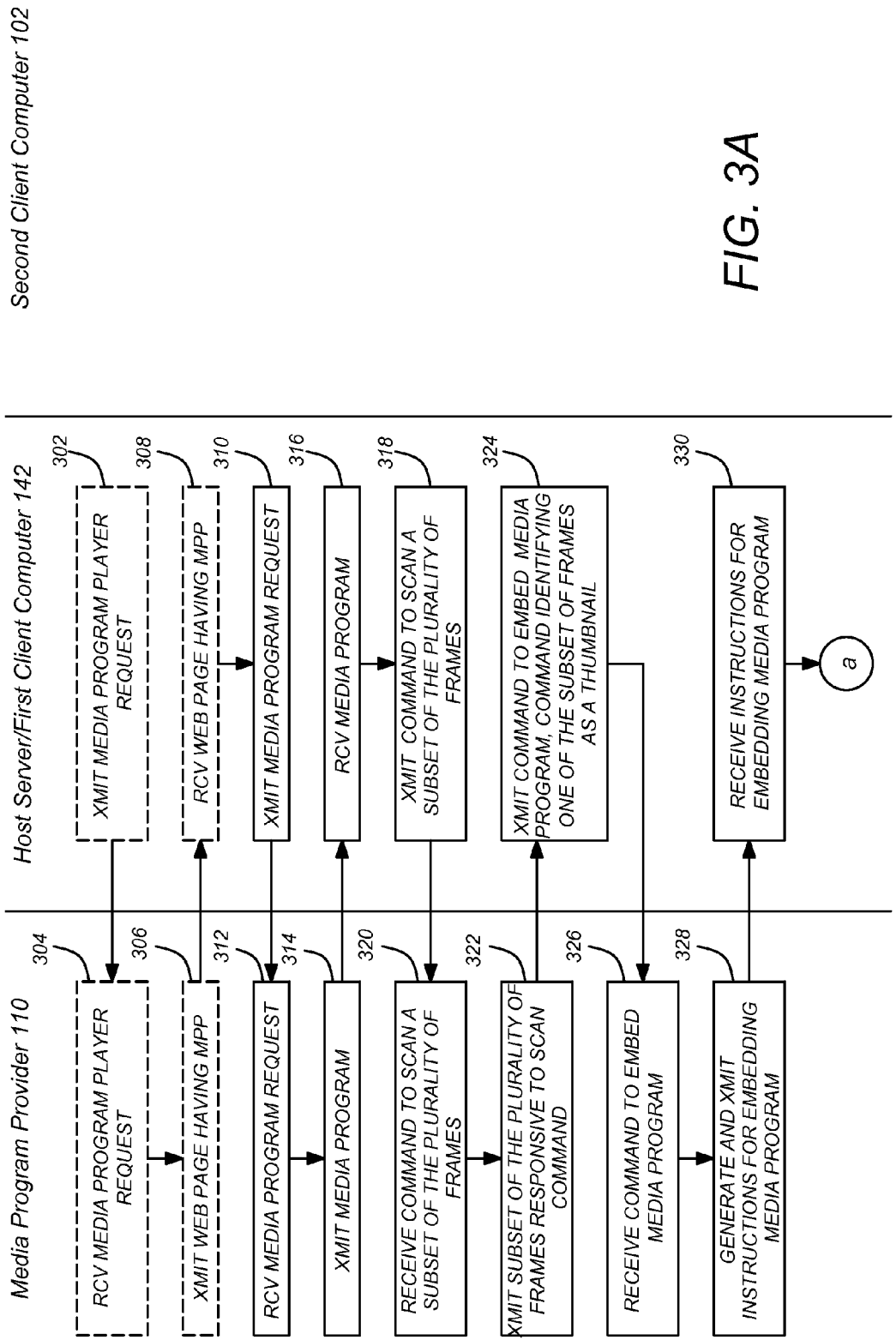
FIGS. 3A-3C are diagrams illustrating exemplary method steps that can be used to practice one embodiment of the invention. A media program player is provided to the first client computer.
Figure 3B:
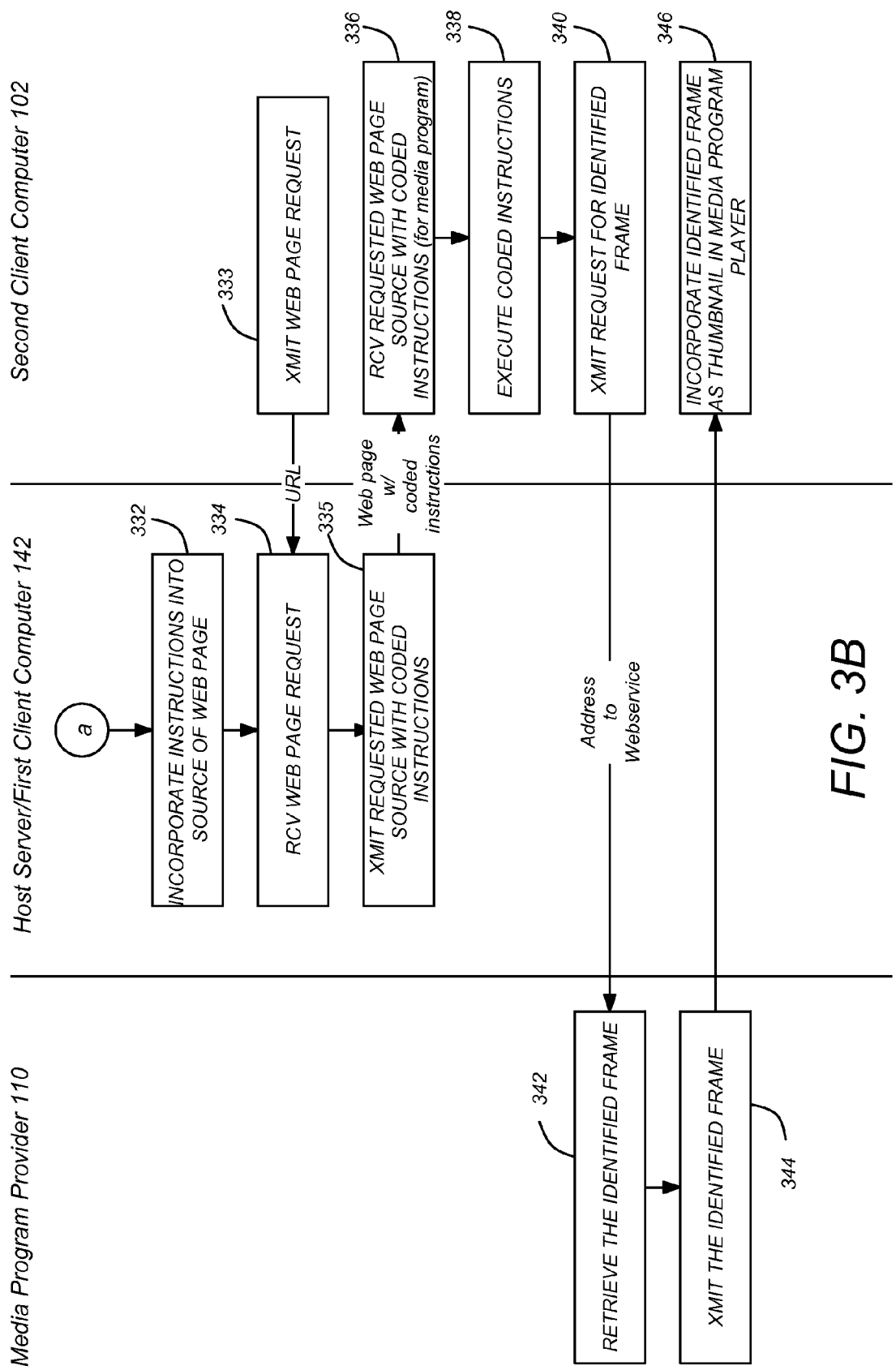
Figure 3C:
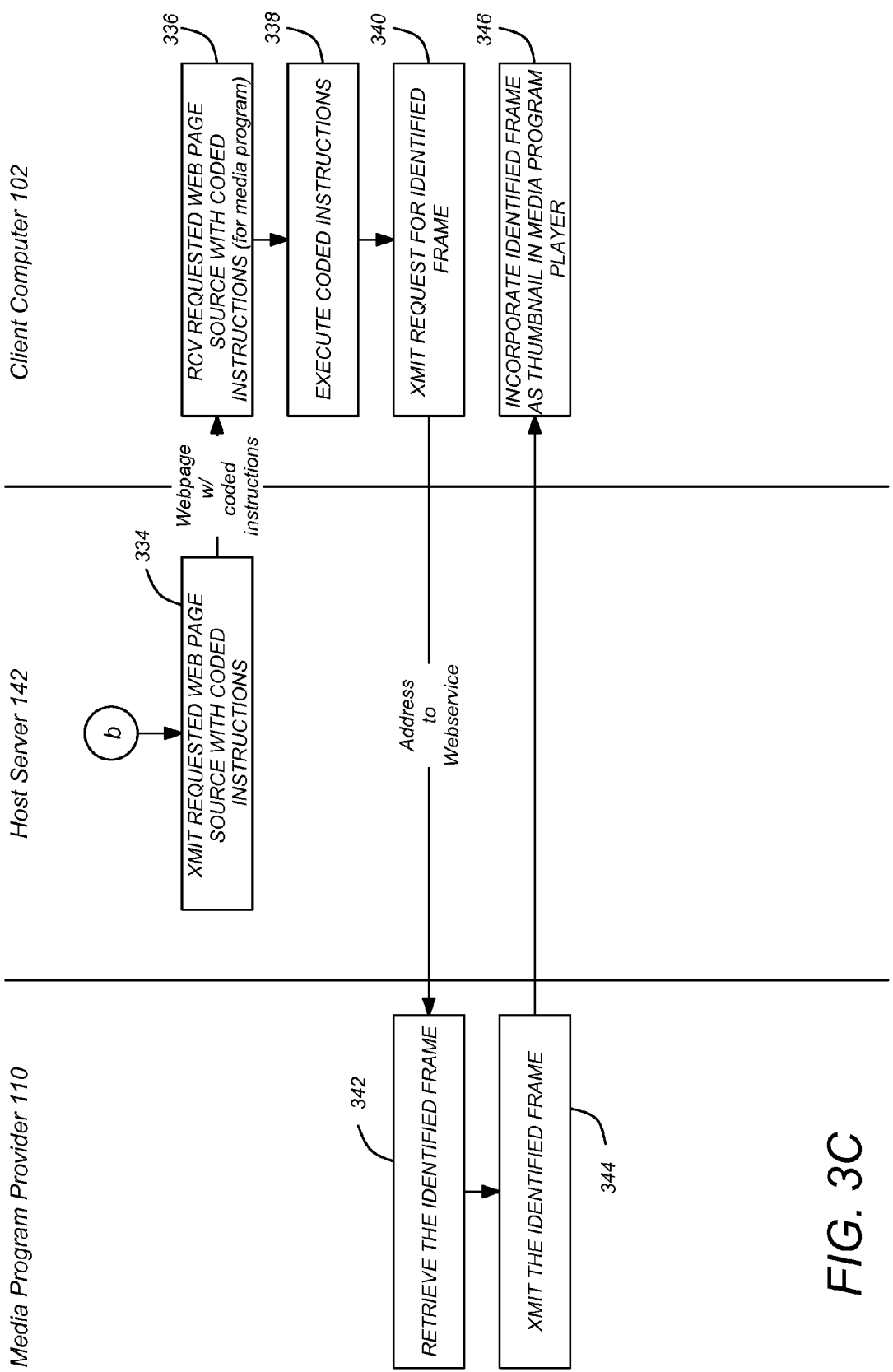

FIGS. 3A-3C are diagrams illustrating exemplary method steps that can be used to practice one embodiment of the invention. A media program player is provided to the first client computer. In the illustrated embodiment, the first computer is the host server 142, but the first client computer can be the client computer 102 or any computer in communication with the media program provider 110. In one embodiment, the media program player is provided to the host server 142 by the transmission of a webpage having a media program player as described below. However, the media program player need not be embedded in a webpage and may be transmitted to the host server by any means.

In block 302, a media program player is transmitted from a first computer to the media program provider 110. The media program provider 110 receives the media program player request, and transmits the media program player to the host server 142, where it is received as shown in blocks 304-308. The host server renders the received media program player, for example, in a webpage.

Figure 4:
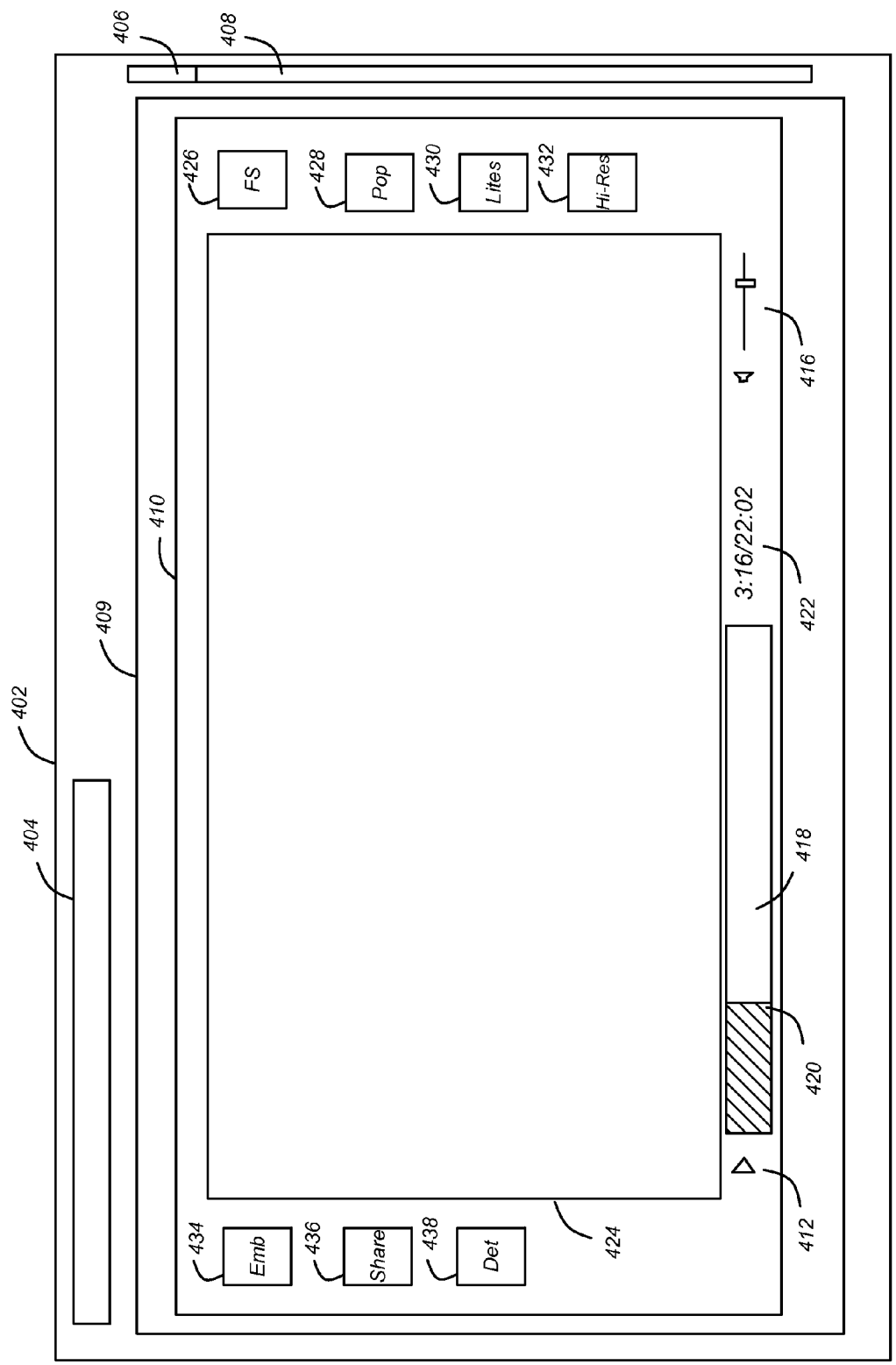
FIG. 4 is a diagram of an exemplary browser presenting an example of rendered webpage implementing a media program player.

FIG. 4 is a diagram of an exemplary browser 402 presenting an example of rendered webpage 409 implementing a media program player 410. A webpage 409 is an image manifested on a computer display, the contents of which is determined by executing a file that comprises source code (alternatively referred to hereinafter as "webpage source" or "webpage source code") that is typically expressed in a markup language such as HTML using a plurality of textural characters. When the source code is read and interpreted by the browser implemented on the computer (described further below), a browser 402 generates data which is presented in the webpage on a display communicatively coupled to the computer. In one embodiment, the webpage source code is a text file that comprises text describing content as well as commands that describe how the content is to be presented (e.g. by including one or more sets of HTML tags that describe how the text should be formatted when presented by the browser 402) and where the content may be obtained. The commands may also include commands for generating webpage controls that are used to activate certain webpage functionality.

In the illustrated embodiment, the browser 402 has an address field 404 for entering the universal resource locator (URL) of websites and webpages of interest. The browser 402 may also have a scroll bar 408 and an associated scroll control 406 to allow different portions of the webpage 409 to be displayed.

In the illustrated embodiment, webpage 409 also includes an embedded media program player 410. The embedded media player 410 can be used to play media programs that are downloaded, streamed, or progressively downloaded from a host website (e.g. the website hosting the currently viewed webpage) or third party websites. This can be accomplished by including appropriate embedded media player 410 instructions into the webpage source. Typically, such instructions include a link to the URL of the media program depicted by the media program player 410 the webpage 409.

The embedded media program player 410 may include a play area 424 for displaying the media program, a play control 412 for playing and pausing the playback of the media program, a progress bar 418 having a progress annunciator 420 showing the temporal progress of the playback of the media program, a timer 422 showing the current temporal location of the playback of the media program and the total time of the media program, and an audio slider 416 for adjusting the volume of the played back media program. Using the pointing device 216 or keyboard 214, the progress annunciator 420 can be selected and moved to temporally different portions of the program, allowing the user to move to any desired temporal point in the media program.

In one embodiment, the media program player 410 also includes a full screen control 426 for commanding the media program player to occupy the full screen of the webpage 409, a popout control 428 for opening popout webpage, a "lights" control 430 for changing the color scheme of the rendered webpage to give the appearance of a darkened theater, a resolution control 432 for selecting a high-resolution version of the media program, a share control 436 for posting the video to one of a number of different websites such as FACE-BOOK and MYSPACE, and a details control 438 for viewing details about the media program.

Returning to FIG. 3A, the host server 142 transmits a request for a media program, as shown in block 310. The media program request may be in response to a media program selection from a program guide, or activating a media program player 410 pointed to the media program. The media program provider 110 receives the media program request 312 and transmits the media program to the host server, where it is received, as shown in block 316.

Figure 5:
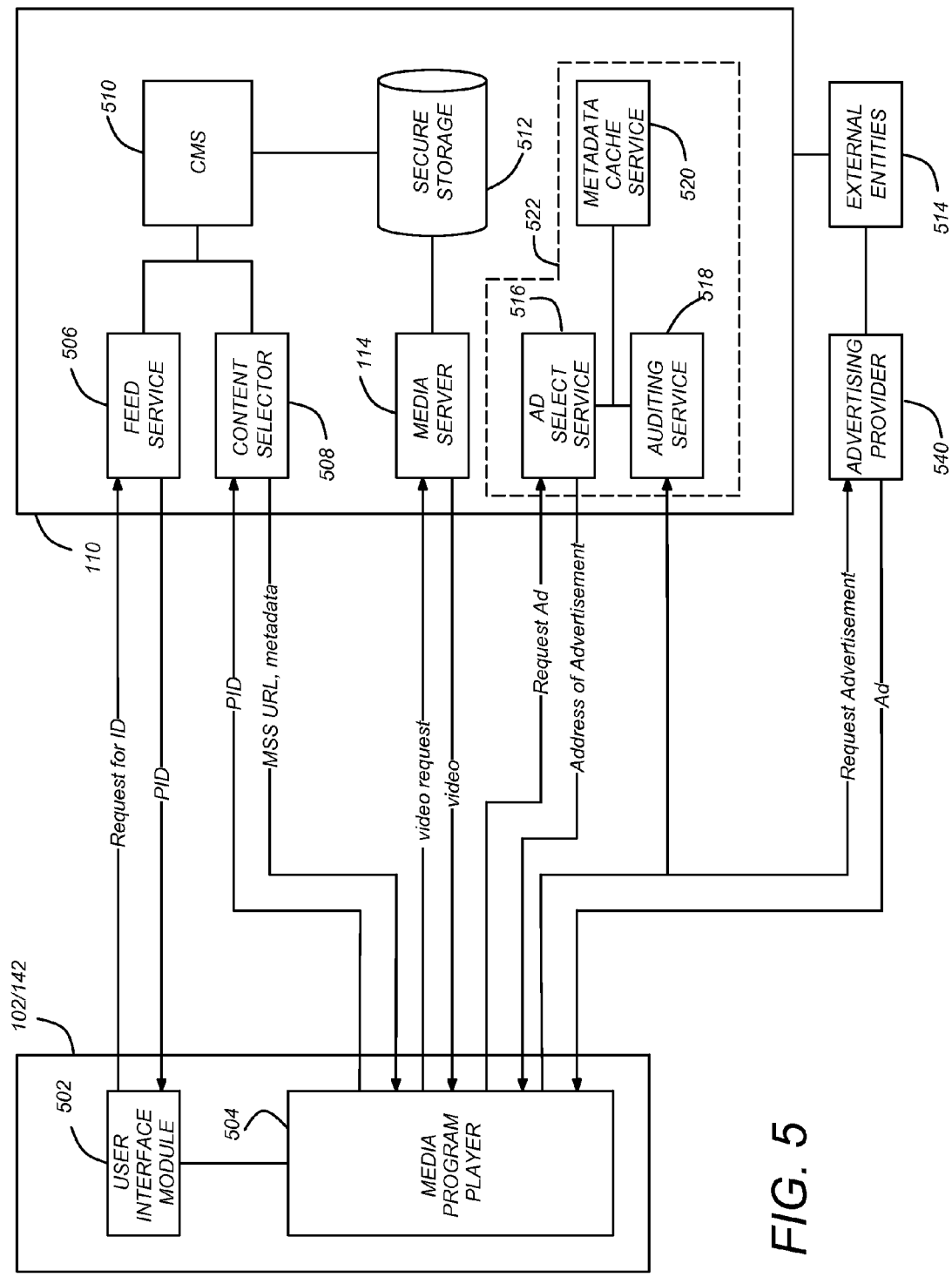
FIG. 5 is a diagram further illustrating a content delivery subsystem that can be used for the provision of media programs in response to a media program request.

FIG. 5 is a diagram further illustrating a content delivery subsystem (CDS) 300 that can be used for the provision of media programs in response to a media program request. Although discussed with reference to the user 132 and the client computer 102, these same operations can be used to present media programs to the host 140 and host server 142 as well, with such media programs later embedded in webpages by the host 140 so that they can be accessed by the client computer 102.

In the illustrated embodiment, the content delivery subsystem 300 includes the user computer 102, the media program provider 110, and an advertisement provider 140. Although the advertisement provider 140 is illustrated as a separate architectural entity than the media program provider 110, the advertisement provider 140 may be integrated within the media program provider 110. The CDS 300 provides a means to provide media programs and advertisements across a plurality of distribution networks, which may include, for example, www.hulu.com, www.imdb.com, www.aol.com or www.msn.com. Metadata related to media program and advertisement content is stored in the content delivery system 300, as is data describing where the media programs and advertisements may be found within the CDS 300.

The user computer 102 may include an interface module 502 and a media program player 504. The interface module 502 includes instructions performed by the user computer 102 that are used to present information to the user 132 and to accept user input, including commands. The interface module 502 may also be integrated with the media program player 504. The presented information may include a program guide, advertisement options, and the user input may include selected advertisement options and media program playback selections.

Using the user computer 102 and the interface module 502, the user 132 enters a choice for a media program. The user interface module 502 transmits a request message to a feed service 506 implemented by the media program provider 110 for a program identifier (PID). The PID is used to identify content such as a specific media program running on a specific distribution network. For example, season 2 of "The Office" running on www.hulu.com will have a different PID than the same exact show running on www.msn.com.

The feed service 506 then returns the PID to the user interface module 502. The PID and associated commands (e.g. the play command) are provided to the media program player 504. The media program player 504 may be embedded in a webpage from a third party, or may be part of a webpage maintained by the media program provider 110, or may be implemented in a stand alone application.

The media program player 504 transmits the PID to a content selector 508 implemented by the media program provider 110. The content selector 508 identifies the actual path (uniform resource locator or URL, for example) to the requested media program associated with the transmitted PID, as well as programming metadata that is used by the media program player 504 to help identify restrictions (for example, preventing access to adult-themed content if the user 132 is known to be under 18), advertising targeting rules as well as advertising breaks. The advertising breaks indicate where advertisements may be inserted, and can be specified in terms of the time since the beginning of the media program, the time remaining, or any other suitable measure. The URL and the metadata are then transmitted to the media program player 504. The media program player 504 provides a video request to the media server 114 at the URL received from the content selector 508. The video request includes the PID and may include other information as well. The video request may be for streaming or progressively downloading the requested media program.

The media streaming server (MSS) 114 responds to the video request by providing the media program to the user computer 102. In one embodiment, the MSS 114 is a service provider that has a wide range of geographically distributed computers that store replicated copies of media programs and website content. The MSS 114 can be a third party provider (e.g. only contractually associated with the media program provider 110), or can be part of the media program provider 110. Geographically diverse servers assure that when the user 132 requests playback of a media program, the media program is streamed from a geographically local server, to increase media program playback performance. Multiple servers also offer redundancy.

The MSS 114 obtains the media program from secure storage 512 which may be disposed in the media program provider 110 facility, or which may be disposed at a third party facility. The content management service 510 interfaces with the feed service 506, the content selector 508, and secure storage 512 to manage which media programs are provided to the media server 114. External entities 514 can include third parties such entities that provide the advertisements that are to be displayed to the user (which includes sponsors and/or their advertising agencies), third party providers of media programs, and entities from which the user 132 may purchase goods or services.

The media program is transmitted (via streaming or progressive downloading, for example) to the media program player 504. At or before the times identified in the advertising breaks defined above, the media program player 504 transmits an advertisement list request to the advertisement server (ad server) 522. The ad server 522 includes an intercoupled advertisement select service 516, metadata cache service 520, and auditing service 518. In one embodiment, the advertisement request includes information describing the media program currently being viewed by the user as well as information about the user. This information can be used to select advertisements to be shown along with the media program. The metadata cache service 520 performs off-line computations to determine the logical requirements of the advertisement rules (which describe the media program and user characteristics consistent with the advertisement). When an advertising request is received, the ad select service 516 retrieves the precomputed information and compares the precomputed logical characteristics of the advertising rules with the advertisement request. Advertisements requests that have characteristics meeting the advertisement rules are then identified. The address of the selected advertisement(s) are then transmitted to the media program player 504. At or before the advertisement break, the media program player 504 sends a request for the advertisement to the URL of the advertising provider 540, which transmits the advertisement to the media program player 504 for playback.

Returning to FIG. 3A, the host server 142 transmits a command to scan a subset of the plurality of frames that together comprise the media program, as shown in block 318. The generation of the subset of frames is described further below, but may include frames that span the entire media program. In other words, unlike other methods and devices for embedding media programs, which require the user to select from a few pre-selected thumbnails, the user is allowed to select a frame from any portion of the media program. In one embodiment, this is accomplished by first selecting the embed control 434 of the media program player 410. This can open up an interface for embedding a media program in a webpage.

Figure 6:
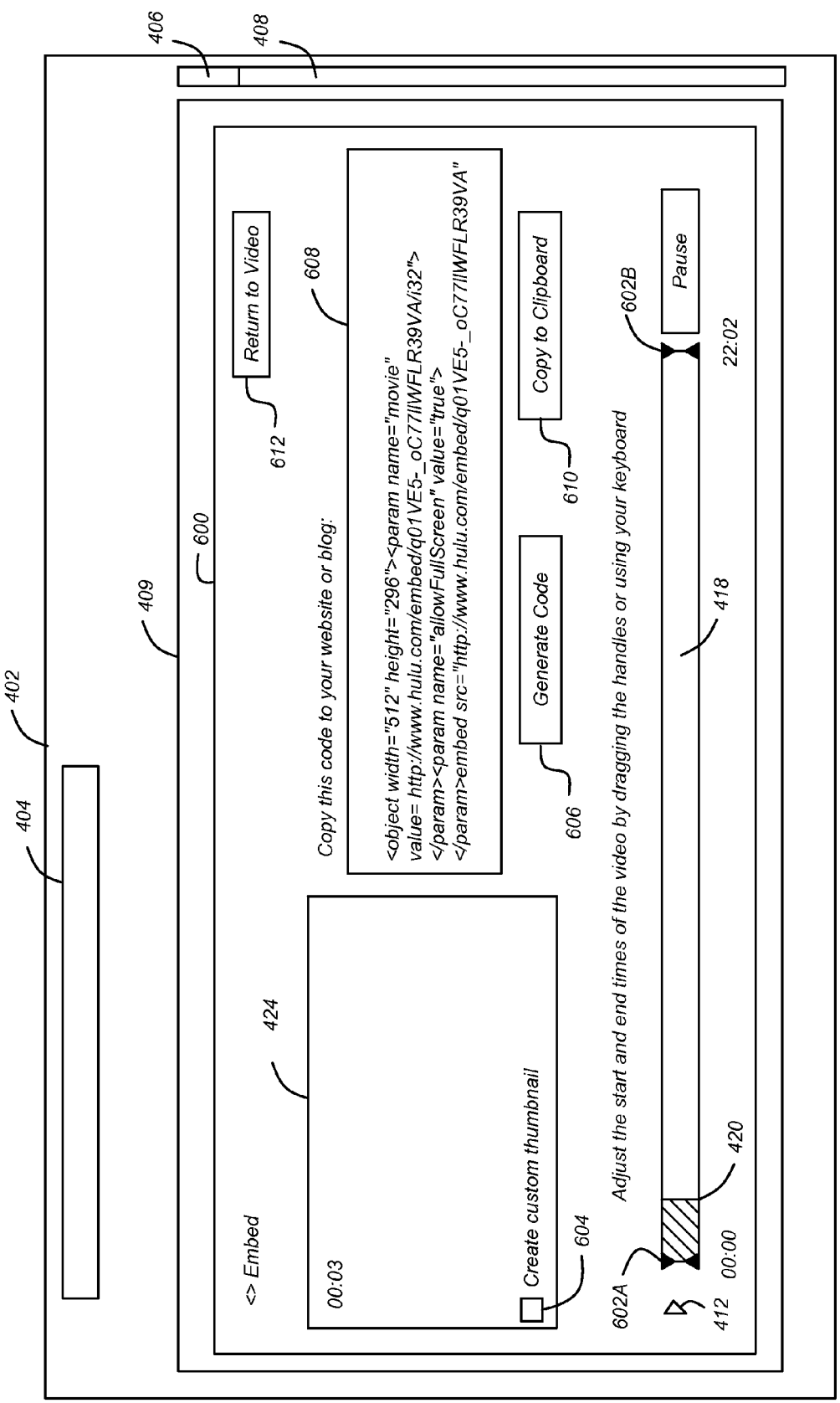
FIG. 6 is a diagram illustrating one embodiment of an interface for scanning a subset of the plurality of frames of the media program and for generating code for embedding the media program player in a webpage.

FIG. 6 is a diagram illustrating one embodiment of an interface 600 for scanning a subset of the plurality of frames of the media program and for generating code for embedding the media program player in a webpage. The interface 600 comprises a play area 424, play/pause control 412, progress bar 418 and progress annunciator 420 with functionality analogous of the media program player 410 shown in FIG. 4. In one embodiment, the interface 600 permits the user to embed only a portion of the media program in the website. The portion that the user wishes to include into the media program can be defined by use of first 602A and second 602B edit bars. The user uses the pointing device 216 to move the first edit bar 602A to the temporally earliest point in the media program that the user intends to included in the embedded portion of the media program and moves the second edit bar 602B to the temporally latest point that the user wishes to include in the media program. By moving the edit bars 602 to the appropriate locations on the progress bar 418, the user can define the portion of the media program for which embedded code will be later generated. While the illustrated embodiment shows only two edit bars that can be used to identify a single portion of the media program, in other embodiments, additional edit bars are provided, allowing the user to define a plurality of portions to be embedded. This allows the user to patch together a series of clips, potentially in user selected order.

In one embodiment, the user moves the edit bars 602 to select the portion of the media program they wish to embed, then manipulates the play/pause control 412 or the progress annunciator 420 to scan the subset of frames of the media program so as to display a frame among the subframes that the user would like for the thumbnail for the embedded portion of the media program.

The command is transmitted to the media program provider 110, as shown in block 318. The media program provider 110 receives the command, as shown in block 322, and transmits those frames of the subset of frames that are responsive to the scan command, as shown in block 322. In the embodiment shown in FIG. 6, the received frames are presented in the play area 424.

In one embodiment, the scan command includes an index to one of the subset of frames. For example, manipulation of the progress annunciator 420 causes media program player of the host server/client computer 142 to transmit an index identifying the requested frame to the media program provider 100, and the media program provider 110 responds to the request by providing the frame of the subset of frames that corresponds to the index. As the user manipulates the progress annunciator 420 to other locations, other indices are transmitted to the media program player and the frames associated with those other indices are transmitted to the host server/client computer 142 for presentation in the play area.

When the play area 424 renders the frame of the subset of frames that the user would like to use as the thumbnail for the embedded media program, the user can identify or select that frame by selecting the thumbnail checkbox 604.

Returning to FIG. 3A, a command to generate coded instructions for embedding the selected portion of the media program is transmitted, as shown in block 324. This can be accomplished by selecting the generate code control 606. In one embodiment, the command includes information necessary to identify the media program (such as the PID), the time codes for the beginning and end times of the requested clip, and the time code of the frame selected for the thumbnail, which identifies the selected frame of the subset of frames for use as a thumbnail. The media program provider 110 then receives the command to embed the media program, as shown in block 326 and generates the instructions for embedding the portion of the media program and the media program player in the webpage, as shown in block 328. The generated instructions are then transmitted to the host server 142, as shown in block 328 and received in the host server/client computer 142 as shown in block 330.

In the foregoing embodiment, the media program implemented by the host server/client computer 142 accepts user commands, and transmits those commands to the media program provider 110, which retrieves and transmits the subset of frames to the host server/client computer 142. Further, the media program provider 110 receives the request to generate the embedding code, generates the code, and transmits the code to the host server/client computer 142 to be embedded. However, the same result can be achieved with differently allocated functionality. For example, the host server/client computer 142 may receive the subset of frames with the media program or may generate the subset of frames from the media program. In this case, a command to scan those subset of frames would be accepted and acted on in the host server/client computer 142, using locally stored frames. Further, the generation of the instructions for embedding the media program may take place in the host server/client computer 142 without need for the media program provider 110. Other embodiments are possible wherein the allocation of this functionality is performed by any of the entities shown in FIG. 1.

The generated code may be listed in the embedded code window 608 for the user to inspect and/or modify as desired. The coded instructions can be copied into the source of a webpage, blog, or forum, as shown in block 331 of FIG. 3B. This can be accomplished by copying the embedded code (either by manually selecting and copying it or selecting the "copy to clipboard" control 610) and pasting it into the appropriate webpage source, blog, or forum.

Although the code generation can be manually initiated using controls in the interface 600, this operation may also be performed automatically when the frame used for the thumbnail is selected, and the resulting embedded code may also be automatically copied to the clipboard for pasting in the webpage source.

In one embodiment, the coded instructions include a global address to the media program appended by an index to the identified frame. For example, if a custom thumbnail is not selected, the address to the media program used in the generated embeddable code may be as follows:

http://www.hulu.com/embed/q01VE5-_oC7711WFLR39VA

However, if a custom thumbnail is desired and the custom thumbnail is 32 seconds after the beginning of the media program, the global address to the media program may be:

http://www.hulu.com/embed/q01VE5-_oC7711WFLR39VA/i32

The "i32" portion appended to the original address identifies which frame of the media program is to be used for the custom thumbnail.

Figure 7:
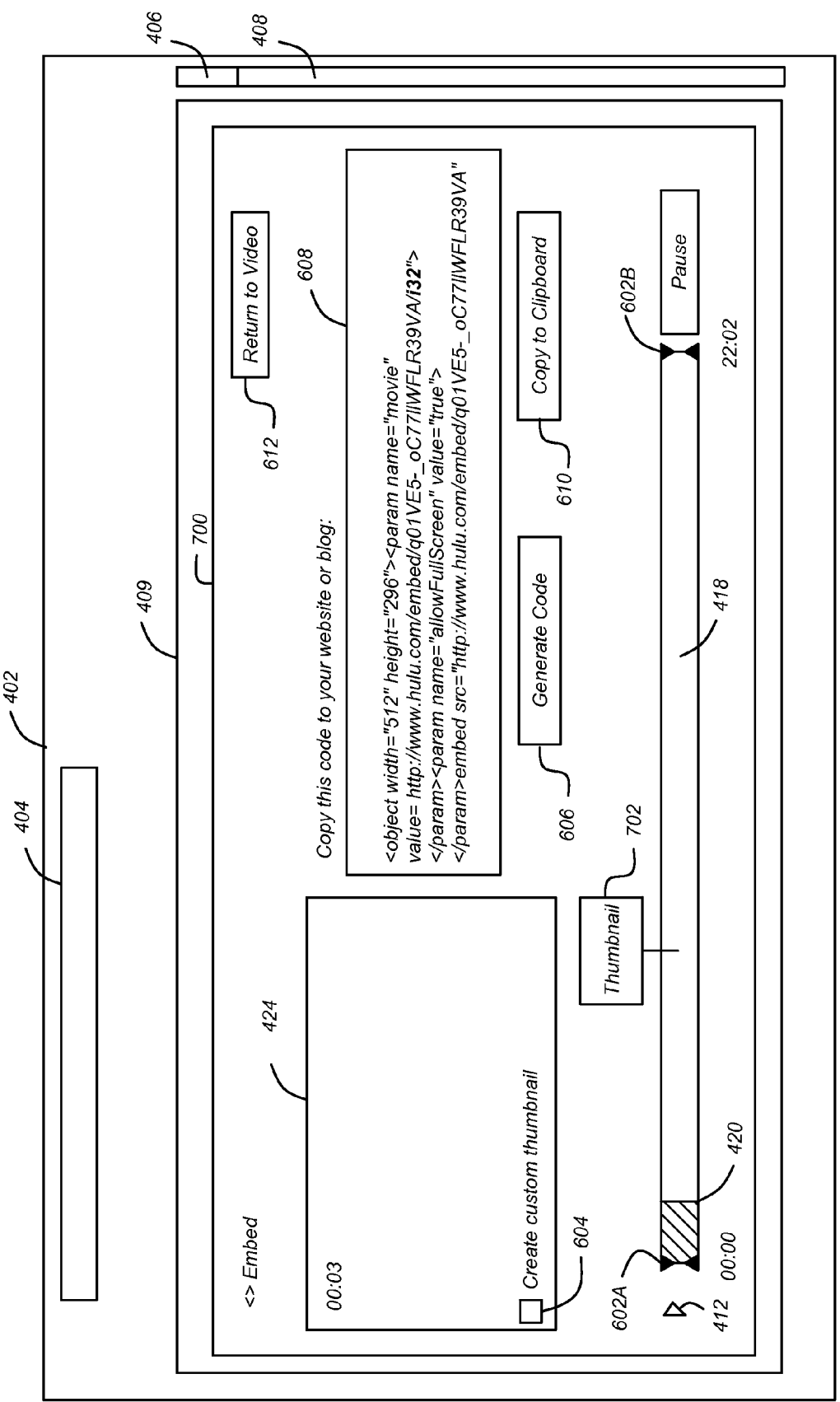
FIG. 7 is a diagram showing an alternative embodiment of the interface.

FIG. 7 is a diagram showing another embodiment of an alternative embodiment of the interface 700. In this embodiment, the thumbnail is selected by selecting and dragging a handle or thumbnail control 702 across the progress bar 418 until the desired frame is presented in the thumbnail area 702 proximate the thumbnail control 702.

Returning to FIG. 3B, the second client computer 102 may transmit a webpage request to the host server/first client computer 142 at the URL of the webpage, as shown in block 330. The host server receives the webpage request as shown in block 334, and transmits the requested webpage source having the embedded code to the client computer, as shown in block 335. The client computer 102 receives the webpage source, and a browser in the client computer 102 executes the coded instructions, as shown in blocks 336-338. Using the coded instructions, the client computer 102 transmits a request for the identified frame to use as a thumbnail to visually represent the media program in the media program player that is rendered in the webpage presented by the second client computer 102 using the webpage source received in block 336. In the illustrated embodiment, the request is transmitted to a web service address in the media program provider. The thumbnail request can be of the following form:

http://m.hulu.com/thumb?id={video id}&s={time code} wherein the "video id" is an identification of the video that is to be presented on the client computer's media program player, and the "time code" is an index to the frame or thumbnail that is to be presented by the client computer's media program player to visually represent the media program. In the above example, a representative thumbnail request may be as follows:

http://m.hulu.com/thumb?id=13865861&s=32 indicating that the frame from which the thumbnail is obtained is 32 seconds after the first frame of the media program.

Returning to FIG. 3B, the media program provider retrieves the identified frame, as shown in block 342, and transmits the identified frame to the second client computer, where it is received and incorporated as a thumbnail for the media program, as shown in blocks 342-346.

In the foregoing description, the user is able to select the thumbnail from a subset of media program frames. A subset of the media program frames is used because burdensome storage, management and addressing capabilities may be required if all of the media program frames were available for selection. To ameliorate this problem, the user is constrained to select from a subset of the media program frames when selecting a frame for the custom thumbnail, as described above. However, other embodiments are possible in which all of the frames of the media program are available for use as a thumbnail (that is, the subset of frames is the set of all of the frames of the media program). This can be implemented by streaming the media program to the host server/client computer 142 in response to a command. When the media program frame of interest is displayed to the user, the user indicates as such, and a command is transmitted to the media program provider identifying the currently played frame as the desired thumbnail.

With regard to embodiments in which a subset of frames is provided for use as thumbnails, the subset of frames can be defined and extracted using a variety of techniques. In a first embodiment, a frame is extracted such that each of the extracted frames is separated from a temporally adjacent frame by a thumbnail frame period that is greater than the frame period of the media program. For example, the subset of frames can be selected every one second of the media program. This can be accomplished, for example, using the FFMPEG codec. Although a constant thumbnail frame period would ordinarily be used, a variable thumbnail period may also be used, with a shortened period used when there are frequent scene changes in the media program. Selecting the thumbnail to be less than the duration of any scene in the media program assures that at least one thumbnail can be extracted for each scene.

In another embodiment, the extracted frames are all of the I-frames of the media program. Since I-frames comprise a minority of MPEG or similarly coded video, limiting the user's choice to I-frames reduces storage requirements and obviates the need for further processing to reconstruct the frame from nearby frames, as may be required if P or B frames were used. In another embodiment, the user's choice of thumbnails is limited to a subset of the I-frames of the media program.

In still another embodiment, the frames of a media program are not saved for use as thumbnails in advance, but only saved after a user has selected that frame for a thumbnail. Since users are likely to choose the same thumbnails as other users (popular scenes or actors), this can also reduce storage requirements. In this embodiment, a plurality of messages are received from a plurality of users, each identifying frame of the plurality of media program frames. Each of the identified frames is designated as belonging to the subset of the plurality of frames available for thumbnails.

Finally, a combination of the foregoing techniques could be used. That is, frames available for thumbnails may be pre-selected by the media program provider (for example, every I-frame, or every second of the media program), as a baseline, but any frame requested by a user for a custom thumbnail may also be stored in addition. Furthermore, embodiments in which the thumbnails are not pre-stored, but simply provided to the user computer when requested can also be implemented.

Even using the foregoing techniques, the storage and retrieval requirements for custom thumbnails may be severe. For example, the storage of a frame of a media program every second for thumbnail purposes can result in over 50 million image files that have to be indexed and stored. Most file management systems are incapable of handling this number of files. For example, NETAPP (an enterprise storage system) can manage a maximum of 30 million files.

FIG. 8 is a diagram illustrating the structure of one embodiment of a thumbnail file 802. In this embodiment, a single thumbnail file stores all of the frames used for custom thumbnails for one particular media program. The naming convention of the file may include the media program identifier (for example, the name may comply with the naming convention "{media programID}.tnl."

In the illustrated embodiment, the thumbnail file 802 comprises an index 804 and a series of concatenated frames or images that are available for use as thumbnails. The index 804 comprises a first portion 804A that specifies the number of frames or images in the thumbnail file 802, and a second portion 804B that specifies the start location or logical offset within the file where the data for each of the frames 806A-806N or images begin. The thumbnail file 802 also comprises the images corresponding to the frames selected from the media program and thus available for selection as a thumbnail. In this embodiment, the identified frame is retrieved by using the media program identifier to retrieve and open the appropriate thumbnail file, then using the identified frame to find the beginning of the data representing the identified frame. For example, if the media program is 90 minutes long and the frames available for use as a thumbnail consist of frames taken one second apart and if the request for the identified frame is:

http://m.hulu.com/thumb?id=13865861&s=32 the media program provider 110 will open the 13865861.tnl file, read the index to find that there are 90×60=5460 frames available for use as a thumbnail, and select the 32nd image stored in the file for the thumbnail. To find the 32nd image, the media program provider 110 reads the index section portion 804B and finds the start location or logical offset to the 32nd image, and transmits the identified image or frame to the client computer, as shown in block 344. The client computer 102 receives the identified frame or image and the media embedded media program player executing in the client computer uses the received frame the identified frame as a thumbnail. Thereafter, the client computer 102 may access and play the media program using the embedded media program player using the operations illustrated in FIG. 5.

CONCLUSION

This concludes the description of the preferred embodiments of the present invention. The foregoing description of the preferred embodiment of the invention has been presented for the purposes of illustration and description. It is not intended to be exhaustive or to limit the invention to the precise form disclosed. Many modifications and variations are possible in light of the above teaching. It is intended that the scope of the invention be limited not by this detailed description, but rather by the claims appended hereto. The above specification, examples and data provide a complete description of the manufacture and use of the composition of the invention. Since many embodiments of the invention can be made without departing from the spirit and scope of the invention, the invention resides in the claims hereinafter appended.

What is claimed is:

1. A method of embedding a media program having a plurality of frames, the embedded media program having a user-selected thumbnail, the method comprising:
receiving a command to scan a subset of the plurality of frames, the subset of the plurality of frames spanning the media program;
transmitting at least one of the subset of the plurality of frames responsive to the received scan command to a user interface for display in the user interface;
receiving a command to embed the media program, the command identifying one of the subset of the plurality of frames as a thumbnail for visually representing the media program, wherein only the subset of the plurality of frames are eligible for visually representing the media program;
generating instructions for embedding the media program, the instructions including a global address to request at least a portion of the media program for playing, the global address having a first index to the identified frame; and
transmitting the generated instructions, the instructions configured to embed the media program in a media program player on a page at a client,
wherein the instructions cause the client to determine and send a second address different from the global address using the instructions and the global address to request a thumbnail that will be used to represent the media program in the media program player before sending a request using the global address for the media program for playing in the media program player on the page, and wherein the second address is based on the first index in the global address and the first index is used to determine the thumbnail from a file associated with the media program.

2. The method of claim 1, further comprising generating the subset of the plurality of frames.

3. The method of claim 2, wherein each frame of the subset of the plurality of frames is separated from a temporally adjacent frame by a thumbnail frame period greater than a frame period of the media program.

4. The method of claim 3, wherein the thumbnail frame period is constant.

5. The method of claim 4, wherein the thumbnail frame period is less than the duration of any scene of the media program.

6. The method of claim 4, wherein the thumbnail frame period is approximately one second.

7. The method of claim 2, wherein the media program comprises a plurality of scenes and the plurality of frames comprises a frame from each of the scenes.

8. The method of claim 2, wherein the plurality of frames comprises each I-frame of the media program.

9. The method of claim 2, wherein generating the subset of the plurality of frames comprises:
receiving a plurality of messages from a plurality of users, each of the plurality of messages identifying a frame of the plurality of frames as a thumbnail frame from a client; and
designating the identified frames identified by the plurality of messages as belonging to the subset of the plurality of frames.

10. The method of claim 1, wherein transmitting the subset of the plurality of frames responsive to the received scan command, comprises:
receiving the scan command, the scan command having an index to one of the subset of the plurality of frames;
retrieving the one of the subset of the plurality of frames according to the index; and
transmitting the retrieved frame.

11. The method of claim 1, further comprising:
in response to an execution of the generated instructions by the client, receiving a request for the identified frame, wherein the request comprises the second address to a web service having the first index and an identifier of the media program;
retrieving the identified one of the subset of the plurality of frames; and
transmitting the identified one of the subset of the plurality of frames to the client in response to the request.

12. The method of claim 11, wherein the first index is a time code to the identified one of the subset of the plurality of frames.

13. The method of claim 12, wherein the time code is appended to the address.

14. The method of claim 11, wherein retrieving the identified frame comprises:

retrieving a file using the identifier of the media program, the file having a plurality of concatenated frames and a second index to the plurality of concatenated frames, wherein the plurality of concatenated frames includes the identified frame and wherein the second index indexes the plurality of concatenated frames by a start location of each of the frames in the file;

reading the second index; and retrieving the frame according to the second index.

15. The method of claim 1, wherein receiving the command to scan the subset of the plurality of frames comprises:

receiving a command to stream the media program to the media program player;

streaming the media program to the media program player; and receiving a command to identify the currently played frame of the media program as the custom thumbnail for the media program.

16. The method of claim 1, wherein receiving the command to scan the subset of the plurality of frames comprises:

receiving a command designating a temporal location in the media program;

retrieving a frame from the subset of the plurality of frames associated with the temporal location in the media program; and transmitting the retrieved frame.

17. The method of claim 1, wherein receiving the command to scan the subset of the plurality of frames comprises:

receiving a command designating a temporal location in the media program from a remote client computer;

wherein the temporal location is selected by dragging a handle on a progress bar in a media program player executing on the remote client computer;

retrieving a frame from the subset of the plurality of frames most closely associated with the temporal location in the media program; and transmitting the retrieved frame to the remote client computer.

18. The method of claim 1, wherein:

the temporal location is selected by dragging a handle on a progress bar in a media program player executing on a remote client computer; and the retrieved frame is presented in the media program player.

19. The method of claim 1, wherein:

the command to scan the subset of the plurality of frames is received from a media program player executing in a remote client computer;

the subset of the plurality of frames is transmitted to the media program player executing in the remote client computer;

the command to embed the media program is received from the media program player; and the generated instructions are transmitted to the media program player for incorporation into the source of a webpage.

20. An apparatus for embedding a media program having a plurality of frames, the embedded media program having a user-selected thumbnail, comprising:

one or more computer processors; and a non-transitory computer-readable storage medium comprising instructions, that when executed, control the one or more computer processors to be configured for:

receiving a command to scan a subset of the plurality of frames, the subset of the plurality of frames spanning the media program;

transmitting at least one of the subset of the plurality of frames responsive to the received scan command to a user interface for display in the user interface;

receiving a command to embed the media program, the command identifying one of the subset of the plurality of frames as a thumbnail for visually representing the media program, wherein only the subset of the plurality of frames are eligible for visually representing the media program;

generating instructions for embedding the media program, the instructions including a global address to request at least a portion of the media program for playing, the global address having a first index to the identified frame; and transmitting the generated instructions, the instructions configured to embed the media program in a media program player on a page at a client, wherein the instructions cause the client to determine and send a second address different from the global address using the instructions and the global address to request a thumbnail that will be used to represent the media program in the media program player before sending a request using the global address for the media program for playing in the media program player on the page, and wherein the second address is based on the first index in the global address and the first index is used to determine the thumbnail from a file associated with the media program.

21. The apparatus of claim 20, further configured for generating the subset of the plurality of frames.

22. The apparatus of claim 21, wherein each frame of the subset of the plurality of frames is separated from a temporally adjacent frame by a thumbnail frame period greater than a frame period of the media program.

23. The apparatus of claim 22, wherein the thumbnail frame period is constant.

24. The apparatus of claim 23, wherein the thumbnail frame period is less than the duration of any scene of the media program.

25. The apparatus of claim 23, wherein the thumbnail frame period is approximately one second.

26. The apparatus of claim 21, wherein the media program comprises a plurality of scenes and the plurality of frames comprises a frame from each of the scenes.

27. The apparatus of claim 21, wherein the plurality of frames comprises each I-frame of the media program.

28. The apparatus of claim 21, wherein generating the subset of the plurality of frames comprises:

receiving a plurality of messages from a plurality of users, each of the plurality of messages identifying a frame of the plurality of frames as a thumbnail frame from a client; and designating the identified frames identified by the plurality of messages as belonging to the subset of the plurality of frames.

29. The apparatus of claim 20, wherein transmitting the subset of the plurality of frames responsive to the received scan command, comprises:

receiving the scan command, the scan command having an index to one of the subset of the plurality of frames;

retrieving the one of the subset of the plurality of frames according to the index; and transmitting the retrieved frame.

30. The apparatus of claim 20, further comprising:

receiving a request for the identified frame in response to an execution of the generated instructions by the client, wherein the request comprises the second address to a web service having the first index and an identifier of the media program;

retrieving the identified one of the subset of the plurality of frames; and transmitting the identified one of the subset of the plurality of frames to the client in response to the request.

31. The apparatus of claim 30, wherein the first index is a time code to the identified one of the subset of the plurality of frames.

32. The apparatus of claim 31, wherein the time code is appended to the address.

33. The apparatus of claim 30, wherein retrieving the identified frame comprises:
retrieving a file using the identifier of the media program, the file having a plurality of concatenated frames and a second index to the plurality of concatenated frames, wherein the plurality of concatenated frames includes the identified frame and wherein the second index indexes the plurality of concatenated frames followed by a start location of each of the frames in the file;
reading the second index; and
retrieving the frame according to the second index.

34. The apparatus of claim 20, wherein receiving the command to scan the subset of the plurality of frames comprises:
receiving a command to stream the media program to the media program player;
streaming the media program to the media program player; and
receiving a command to identify the currently played frame of the media program as the custom thumbnail for the media program.

35. The apparatus of claim 20, wherein receiving the command to scan the subset of the plurality of frames comprises:
receiving a command designating a temporal location in the media program;
retrieving a frame from the subset of the plurality of frames most closely associated with the temporal location in the media program; and
transmitting the retrieved frame.

36. The apparatus of claim 20, wherein receiving the command to scan the subset of the plurality of frames comprises:
receiving a command designating a temporal location in the media program from a remote client computer, wherein the temporal location is selected by dragging a handle on a progress bar in a media program player executing on a client computer;
retrieving a frame from the subset of the plurality of frames most closely associated with the temporal location in the media program; and
transmitting the retrieved frame to the remote client computer.

37. The apparatus of claim 20, wherein:
the temporal location is selected by dragging a handle on a progress bar in a media program player executing on a remote client computer; and
the retrieved frame is presented in the media program player.

38. The apparatus of claim 20, wherein:
the command to scan the subset of the plurality of frames is received from a media program player executing in a remote client computer;
the subset of the plurality of frames is transmitted to the media program player executing in the remote client computer;
the command to embed the media program is received from the media program player; and the generated instructions are transmitted to the media program player for incorporation into the source of a webpage.

39. An apparatus for embedding a media program having a plurality of frames, the embedded media program having a user-selected thumbnail, comprising:
a first computer, the first computer having a processor communicatively coupled to memory, the memory storing computer instructions comprising instructions for:
receiving a command to scan a subset of the plurality of frames, the subset of the plurality of frames spanning the media program;
transmitting at least one of the subset of the plurality of frames responsive to the received scan command to a user interface for display in the user interface;
receiving a command to embed the media program, the command identifying one of the subset of the plurality of frames as a thumbnail for visually representing the media program, wherein only the subset of the plurality of frames are eligible for visually representing the media program;
generating instructions for embedding the media program, the instructions including a global address to request at least a portion of the media program for playing, the global address having a first index to the identified frame; and
transmitting the generated instructions, the instructions configured to embed the media program in a media program player on a page at a client,
wherein the instructions cause the client to determine and send a second address different from the global address using the instructions and the global address to request a thumbnail that will be used to represent the media program in the media program player before sending a request using the global address for the media program for playing in the media program player on the page, and wherein the second address is based on the first index in the global address and the first index is used to determine the thumbnail from a file associated with the media program.

40. The apparatus of claim 39, wherein the instructions further comprise instructions for generating the subset of the plurality of frames.

41. The apparatus of claim 40, wherein each frame of the subset of the plurality of frames is separated from a temporally adjacent frame by a thumbnail frame period greater than a frame period of the media program.

42. The apparatus of claim 41, wherein the thumbnail frame period is constant.

43. The apparatus of claim 42, wherein the thumbnail frame period is less than the duration of any scene of the media program.

44. The apparatus of claim 42, wherein the thumbnail frame period is approximately one second.

45. The apparatus of claim 40, wherein the media program comprises a plurality of scenes and the plurality of frames comprises a frame from each of the scenes.

46. The apparatus of claim 40, wherein the plurality of frames comprises each I-frame of the media program.

47. The apparatus of claim 40, wherein the instructions for generating the subset of the plurality of frames comprise instructions for:
receiving a plurality of messages from a plurality of users, each of the plurality of messages identifying a frame of the plurality of frames as a thumbnail frame from a client; and designating the identified frames identified by the plurality of messages as belonging to the subset of the plurality of frames.

48. The apparatus of claim 39, wherein the instructions for transmitting the subset of the plurality of frames responsive to the received scan command, comprise instructions for:
  receiving the scan command, the scan command having an index to one of the subset of the plurality of frames;
  retrieving the one of the subset of the plurality of frames according to the index; and
  transmitting the retrieved frame.

49. The apparatus of claim 39, wherein the instructions further comprise instructions for:
  receiving a request for the identified frame in response to an execution of the generated instructions by the client, wherein the request comprises the second address to a web service having the first index and an identifier of the media program;
  retrieving the identified one of the subset of the plurality of frames; and
  transmitting the identified one of the subset of the plurality of frames to the client in response to the request.

50. The apparatus of claim 49, wherein the first index is a time code to the identified one of the subset of the plurality of frames.

51. The apparatus of claim 50, wherein the time code is appended to the address.

52. The apparatus of claim 49, wherein the instructions for retrieving the identified frame comprise:
  instructions for retrieving a file using the identifier of the media program, the file having a plurality of concatenated frames and a second index to the plurality of concatenated frames, wherein the plurality of concatenated frames includes the identified frame and wherein the second index indexes the plurality of concatenated frames by a start location of each of the frames in the file;
  instructions for reading the second index; and
  instructions for retrieving the frame according to the second index.

53. The apparatus of claim 39, wherein the instructions for receiving the command to scan the subset of the plurality of frames comprise instructions for:
  receiving a command to stream the media program to the media program player;
  streaming the media program to the media program player; and
  receiving a command to identify the currently played frame of the media program as the custom thumbnail for the media program.

54. The apparatus of claim 39, wherein the instructions for receiving the command to scan the subset of the plurality of frames comprise instructions for:
  receiving a command designating a temporal location in the media program;
  retrieving a frame from the subset of the plurality of frames associated with the temporal location in the media program; and
  transmitting the retrieved frame.

55. The apparatus of claim 39, wherein the instructions for receiving the command to scan the subset of the plurality of frames comprise the instructions for:
  receiving a command designating a temporal location in the media program from a remote client computer;
  wherein the temporal location is selected by dragging a handle on a progress bar in a media program player executing on a client computer;
  retrieving a frame from the subset of the plurality of frames most closely associated with the temporal location in the media program; and
  transmitting the retrieved frame to the remote client computer.

56. The apparatus of claim 39, wherein:
  the temporal location is selected by dragging a handle on a progress bar in a media program player executing on a remote client computer; and
  the retrieved frame is presented in the media program player.

57. The apparatus of claim 39, wherein:
  the command to scan the subset of the plurality of frames is received from a media program player executing in a remote client computer;
  the subset of the plurality of frames is transmitted to the media program player executing in the remote client computer;
  the command to embed the media program is received from the media program player; and
  the generated instructions are transmitted to the media program player for incorporation into the source of a webpage.

58. The method of claim 1, wherein the subset of the plurality of frames is less than a number of frames in the plurality of frames or the plurality of frames.

\* \* \* \* \*